(12) United States Patent
Dultz et al.

(10) Patent No.: US 6,529,666 B1
(45) Date of Patent: Mar. 4, 2003

(54) SINGLE-MODE OPTICAL FIBER

(75) Inventors: Wolfgang Dultz, Frankfurt/Main (DE);
Reiner Boness, Coswig (DE); Joachim
Vobian, Muehltal (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/786,386
(22) PCT Filed: Sep. 23, 1999
(86) PCT No.: PCT/EP99/06188
§ 371 (c)(1),
(2), (4) Date: Mar. 2, 2001
(87) PCT Pub. No.: WO00/14580
PCT Pub. Date: Mar. 16, 2000

(30) Foreign Application Priority Data

Sep. 2, 1998 (DE) .......................... 198 39 870

(51) Int. Cl.$^7$ ................................. G02B 6/02
(52) U.S. Cl. ....................................... 385/127
(58) Field of Search ................. 385/123, 124, 385/127

(56) References Cited

U.S. PATENT DOCUMENTS

| 5,483,612 | A |   | 1/1996  | Gallagher et al. | 385/127 |
| 5,568,583 | A |   | 10/1996 | Akasaka et al.   |         |
| 5,675,688 | A |   | 10/1997 | Nouchi et al.    |         |
| 5,963,700 | A | * | 10/1999 | Kato et al.      | 385/127 |
| 6,205,279 | B1 | * | 3/2001  | Kim et al.       | 385/127 |
| 6,212,322 | B1 | * | 4/2001  | Ma et al.        | 385/123 |
| 6,275,636 | B1 | * | 8/2001  | Liu et al.       | 385/124 |
| 6,321,016 | B1 | * | 11/2001 | Tirloni et al.   | 385/127 |
| 6,327,403 | B1 | * | 12/2001 | Danziger et al.  | 385/29  |
| 6,363,196 | B1 | * | 3/2002  | Rousseau et al.  | 385/127 |

FOREIGN PATENT DOCUMENTS

| DE | 196 45 754   | 6/1997  |
| EP | 0 721 119    | 7/1996  |
| EP | 0 851 245    | 7/1998  |
| EP | 0 883 002    | 12/1998 |
| WO | WO 97/33188  | 9/1997  |
| WO | WO 98/00739  | 1/1998  |

OTHER PUBLICATIONS

Yadlowsky, M. J. et al., "Optical fibers and amplifiers for WDM Systems", Proceedings of the IEEE, IEEE–US, New York, vol. 85, No. 11, pp. 1765–1779, (ISSN: 0018–9219, pp. 1766–1769).*
Reed, William A. et al., "Tailoring Optical Characteristics of Dispersion–Shifted Lightguides for Applications Near 1.55 μm," AT&T Technical Journal, Sep./Oct. 1986, vol. 65, issue 5, pp. 105–122.*
Onishi, M. et al., "Third–order dispersion compensating fibres for non–zero dispersion shifted fibre links," Electronics Letters, Dec. 5, 1996, vol. 32, No. 25, pp. 2344–2345.*
"True Wave Single Mode Fiber," AT&T Network Systems, 1995, 6 pgs.

* cited by examiner

Primary Examiner—Brian Sircus
Assistant Examiner—Thanh-Tam Le
(74) Attorney, Agent, or Firm—Kenyon & Kenyon

(57) ABSTRACT

The present invention relates to an optical single-mode fiber having low dispersion for the wavelength division multiplex operation (WDM) of an optical transmission path, which is made of a central fiber core having the radius $r_1$, two inner fiber cladding layers having the outer radius $r_2$ and a, respectively, where $a > r_2$, and an outer fiber cladding layer, the refractive index profile n(r) of the fiber not being constant as a function of the fiber radius r (triple-clad fiber). By properly selecting the profile form and the refractive index differences between the core layers and cladding layers, respectively, conventional fabrication methods can be used to manufacture a fiber having low dispersion within the wavelength range of about 1400 to 1700 nm and, thus, in the third optical window, fiber attenuation not being increased thereby.

12 Claims, 5 Drawing Sheets

SINGLE-MODE OPTICAL FIBER

FIELD OF THE INVENTION

The present invention relates to an optical single-mode fiber having low dispersion for the wavelength division multiplex operation (WDM) of optical transmission paths, which is made of a central fiber core, at least two inner fiber cladding layers, and of an outer fiber cladding layer (triple-clad fiber), the refractive index profile n(r) of the fiber not being constant as a function of the fiber radius r.

BACKGROUND OF THE INVENTION

To be able to transmit ever greater data rates over single-mode fibers, the wavelength division multiplex method (WDM) is increasingly gaining in importance. In WDM operation of an optical transmission path, up to 80 to 100 channels having a spectral bandwidth of $\Delta\lambda$ are transmitted over one fiber. The number of channels that can be transmitted over one fiber of a given length is essentially limited by the fiber attenuation and dispersion at the wavelengths being used. Also, the channel spacing needed to ensure transmission quality means that the fibers must have a large enough spectral width for the transmission.

The fiberglass cables installed in the optical networks of telecommunications companies contain all-silica optical fibers, which are made of a fiber core and a fiber cladding. The minimum attenuation of all-silica fibers is within the third optical window, thus within the spectral region of around 1550 nm. In this wavelength range, powerful optical amplifiers are also available, e.g., erbium-doped fiber amplifiers (EDFA), which are used within the optical network to regenerate the transmission signals following a specific path section. For these reasons, the WDM system currently used is conceived for the third optical window.

In the case of pre-installed glass fibers, one can encounter the problem of dispersion. For normal standard fibers, the zero dispersion wavelength $\lambda_0$, at which no dispersion or only very slight dispersion of optical signals occurs, is $\lambda_0 \approx 1310$ nm. This means that a signal transmitted with a wavelength of about $\lambda_0$ is not or only slightly distorted, in particular, the pulse width is retained. However, the attenuation in this range is greater than in the third optical window. The chromatic dispersion $D(\lambda)$ in the case of standard fibers is substantially wavelength-dependent and, for $\lambda$=1550 nm, amounts to about 16 to 17.5 ps/(km*nm). If an optical signal having wavelengths of about 1550 nm is transmitted, the pulse width is enlarged due to dispersion. This effect is an obstacle to a high transmission capacity; a chromatic dispersion of 16 to 17.5 ps/(km*nm) is much too high for ultra-high bit rate systems.

To be able to use laid standard fibers in the third optical window, it is necessary to compensate for the dispersion, which entails considerable outlay. In this regard, one knows of dispersion-compensating fibers, for example, from U.S. Pat. No. 5,568,583, which, at 1550 nm, exhibit a very high negative dispersion of $D \approx -100$ ps/(km nm). These dispersion properties are achieved by raising the refractive index of the fiber core and by lowering the refractive index of a first cladding layer in comparison to the refractive index of the outer fiber cladding, made of silica. For the application, the dispersion-compensating fiber is spliced onto a standard fiber, so that the signal that is separated by positive dispersion when propagating through the compensation fiber is compressed again by the negative dispersion. A dispersion that is high in terms of absolute value is necessary to keep the length of the compensation fibers to a minimum.

It is also known to use special dispersion-shifted DS fibers, which have a zero dispersion wavelength of about 1550 nm, for the third optical window. A DS fiber of this kind is known, for example, from U.S. Pat. No. 5,675,688. In principle, comparably to the dispersion-compensating fibers, the zero wavelengths are shifted through the use of a specific refractive index profile.

However, these DS fibers have decisive disadvantages when used in WDM operation. The dispersion curve $D(\lambda)$ does, in fact, intersect the wavelength axis at about $\lambda_0$=1550 nm, however, in comparison to the dispersion curve of standard fibers, it is merely shifted toward higher wavelength D values. Thus, near 1550 nm, it has a steep rise angle, i.e., a steep slope angle $S(\lambda_0)$, which lies at about 0.09 ps/km*nm$^2$. This applies comparably to 1300 nm standard fibers, as well. This means, that for $\lambda$ values, which differ from $\lambda_0$, one has to expect significant dispersion values, which rise virtually linearly with the spacing from $\lambda_0$. This is, of course, a serious disadvantage, which limits the usable WDM spectrum and, therefore, must be overcome. The second disadvantage of the DS fibers is the relatively small effective surface $A_{eff}$ of the fibers, i.e., the small mode field diameter MFD (Petermann II) and MFD$_{eff}$. They increase the nonlinear refractive index (Kerr coefficient) of the fibers and, thus, nonlinear effects (Brillouin und Raman scattering), which degrade the transmission quality.

Furthermore, to overcome the dispersion problem in the third optical window, optical monomode fibers have been developed as a replacement for standard fibers. In the relevant spectral region, the monomode fibers exhibit low chromatic dispersion, as well as low loss. From the company prospectus "TrueWave™ Single Mode Fiber" of AT&T Network Systems, a fiber is known, which, for wavelengths of about 1540 to 1560 nm, exhibits a chromatic dispersion D of $0.8 \leq D \leq 4.6$ ps/(km*nm), given a mode field radius of 4.2 $\mu$m. Qualitatively, the refractive index profile n(r) shows a triangular core profile, the triangle resting on a broad platform, whose height makes up about one tenth of the height of the triangle. With respect to the silica glass value of n=1.4573 (outer cladding area), only positive n(r) values occur, if one assumes n=1.4573 as the zero level. One forgoes lowering the refractive index level, e.g., through incorporation of fluorine.

A dispersion-shifted fiber is also known from the EP Patent 0851 251 245 A2. For wavelengths of around 1550 nm, it exhibits a dispersion of 1.0 to 4.5 ps/nm/km, a dispersion curve gradient of less than 0.13 ps/nm$^2$/km, and an effective surface of at least 70 $\mu$m$^2$. The core of the fiber is subdivided into four layers, each having a different refractive index level. Contiguous to this fiber core is the outer fiber cladding layer. Thus, it is a quadruple-clad fiber. Another quadruple-clad fiber having at least four levels with a flat dispersion curve (0.03 ps/nm$^2$/km) is known from WO 97/33188. To achieve the desired optical properties, the inner core level must be substantially increased in comparison to the reference refractive index of the outer clad level. In this context, close radius tolerances must be observed, in order to accommodate four layers. It is difficult to produce a refractive index profile with close radius tolerances on a regular basis, in the case where the profile varies considerably within the range of only a few micrometers. For the manufacturing, a plasma CVD process is suited. It enables fine layer structures of this kind to be precisely deposited. This process requires substantial outlay.

The usable spectrum in the third optical window is limited by the spectral operating range of the optical amplifiers (EDFA) used, which is between about 1510 and 1570 nm.

However, since glass fibers, once installed, must be available for many years, one should anticipate future technical development and set the usable operating range of the fibers to be much higher, for instance between 1400 and 1700 nm.

From the EP 0 732 119 A1, a fiber is known, whose fiber core is partitioned into three or four layers, each having a different refractive index level, the maximum value of the refractive index deviation occurring within each layer being given by a reference value, and the dispersion within the wavelength range of 1400 to 1700 nm assuming values between −7 ps/(nm·km) and +5 ps/(nm·km).

SUMMARY OF THE INVENTION

The present invention provides a single-mode WDM fiber having a plurality of layers, each with a different refractive index level, for use in an ultra-high bit rate transmission system, which, given a fiber profile that is technologically simple and cost-effective to produce, has a usable operating range of preferably between 1400 and 1700 nm, a normally large, effective surface or mode-field radius, and a dispersion characteristic D(λ), which, in the spectral region under consideration, is as flat as possible and assumes D(λ) values having a maximum amount of 3.7 ps/(nm*km).

Another embodiment of the present invention provides a single-mode optical fiber having low dispersion for the wavelength division multiplex operation (WDM) of an optical transmission path, made up of a central fiber core having a radius $r_1$, two inner fiber cladding layers having an outer radius $r_2$ and an outer radius a, respectively, where $a > r_2$, and an outer fiber cladding layer, the refractive index profile n(r) of the fiber not being constant as a function of the fiber radius r, and the outer fiber cladding layer, i.e., for the region r>a, having a relative refractive index profile Δ(r), where $$\Delta(r) = \frac{1}{2}\left(\frac{n(r)^2}{n_c^2} - 1\right),$$

for which it holds that Δ(r)≈0, $n_c$ being a constant reference refractive index; and has for the radii $r_1$, $r_2$ and a, as well as for the relative refractive index profile Δ(r), where $$\Delta(r) = \frac{1}{2}\left(\frac{n(r)^2}{n_c^2} - 1\right)$$

of the fiber, the following holds:
 a) 9.0 μm≦a≦15 μm, 0.15≦$r_1$/a≦0.4, and 0.65≦$r_2$/a≦0.85,
 b) in the fiber core, i.e., for r≦$r_1$, it holds that $\Delta_0$≧Δ(r)≧0, where 3.5·10⁻³≦$\Delta_0$≦6.0·10⁻³;
 c) in the first inner fiber cladding layer, i.e., for $r_1$<r≦r2, it holds that 0≧Δ(r)≧$\Delta_1$, where ※2.0·10⁻³≦$\Delta_1$≦0.6·10⁻³;
 d) in the second inner fiber cladding layer, i.e., for $r_2$<r≦a, it holds that $\Delta_2$≧Δ(r)≧0, where 1.0·10⁻³≦$\Delta_2$≦2,0·10⁻³,
so that, within the wavelength range of between 1400 and 1700 nm, the fibers have a dispersion value of between −1.6 and +3,7 ps/(nm·km).

In this context, $n_c$ is a constant reference refractive index, namely the refractive index of the outer cladding, which, as a rule, is made silica glass, where $n_c$=1.4573.

For small differences in refractive indices, as exist here, the relative refractive index defined by $$\Delta(r) = \frac{1}{2}\left(\frac{n(r)^2}{n_c^2} - 1\right),$$

indicates approximately the absolute change in refractive index n(r)−$n_c$, in terms of the cladding refractive index, since $$\Delta(r) \approx \frac{n(r) - n_c}{n_c}.$$

The first inner cladding layer is directly contiguous to the fiber core and is surrounded by the second inner cladding layer. The sequence of layers terminates with the outer fiber cladding layer having reference refractive index $n_c$. Thus, the fiber in accordance with the present invention can be a triple-clad fiber.

The fiber core has a α profile (Δ(r)=$\Delta_0$(1−$r^\alpha$) where α=1 . . . 6) or a trapezoidal profile, or has a constant refractive index (rectangular profile). The refractive indices in the remaining layers are preferably constant. A triple-clad fiber of this kind can be produced simply and cost-effectively, using conventional manufacturing methods as well.

In a further embodiment of the present invention, radius $r_1$ is preferably between 2.5 μm and 5.5 μm, especially preferred is 3.5 μm≦$r_1$≦4.5 μm. For radius r2, values of between 8 and 12 μm should be selected, preferably 9 μm≦$r_2$≦11 μm. For radius a, it holds preferably that 9 μm≦a≦15 μm.

In a further embodiment of the present invention, it holds that: −1.2·10⁻³≦$\Delta_1$≦−0.6·10⁻³.

A core profile form that can be easy to implement, i.e., for r<$r_1$, is a rectangular profile. In this context, the absolute and relative core refractive index for r<$r_1$ is more or less constant, and, in the range of r≈$r_1$, it decreases to the value of the first inner cladding layer. Preferably, the three cladding layers likewise have a constant refractive index, which varies within the above indicated ranges.

In a further embodiment of the present invention, the following parameters can be selected for the fibers having a rectangular profile of the fiber core:
 a) 3.7·10⁻³≦$\Delta_0$≦4.6·10⁻³, preferably $\alpha_0$≈4.16·10⁻³;
 b) 1.8·10⁻³≦$\Delta_1$≦1.4·10⁻³, preferably $\Delta_1$≈−1.59·10⁻³;
 c) 1.6·10⁻³≦$\Delta_2$≦1.9·10⁻³, preferably $\Delta_2$≈1.75·10⁻³;
 d) 9.4 μm≦a≦11.4 μm, preferably a≈10.4 μm, 0.15≦$r_1$/a≦0.4, preferably $r_1$/a≈0.3, and 0.65≦$r_2$/a≦0.85, preferably $r_2$/a≈0.8.

Another form of the core profile can be a triangular profile, Δ(r) assuming the maximum relative and, thus, also the absolute refractive index $\Delta_0$ near the fiber midpoint and, up to r≈$r_1$, decreasing linearly to the value of the first inner cladding layer. Contiguous thereto are cladding layers having a constant refractive index of $\Delta_1$, $\Delta_2$ and, respectively, $\Delta_3$=0.

In a further embodiment of the present invention, the following parameters can be selected for fibers whose core has a triangular profile:
 a) 4.7·10⁻³≦$\Delta_0$≦5.8·10⁻³, preferably $\Delta_0$≈5.31·10⁻³;
 b) 1.0·10⁻³≦$\Delta_1$≦−0.8·10⁻³, preferably $\Delta_1$−0.9·10⁻³;
 c) 1.1·10⁻³≦$\Delta_2$≦1.4·10⁻³ preferably $\Delta_2$≈1.25·10⁻³;
 d) 12.9 μm≦a≦14.9 μm, preferably a 13.9 μm, 0.15≦$r_1$/a≦0.4, preferably $r_1$/a≈0.3, and 0.65≦$r_2$/a≦0.85, preferably $r_2$/a≈0.8.

In a further embodiment of the present invention, the core profile can be a parabola profile of the relative or of the absolute refractive index, the maximum relative and, thus, also absolute refractive index $\Delta_0$ being assumed in the vicinity the fiber midpoint, and $\Delta(r)$ up to r≈$r_1$ decreasing more or less parabolically to the value of the first inner cladding layer. Preferably contiguous thereto, in turn, are cladding layers having a constant refractive index $\Delta_1$, $\Delta_2$ or 0. Fewer mechanical tensions result when there is a continuous transition of refractive indices into one another. For that reason, under certain conditions, a parabola profile of the fiber core can be more stable than a rectangular profile.

In a further embodiment of the present invention, the following parameters can be selected for the fibers where the fiber core has a parabola profile:

a) $3.9 \cdot 10^{-3} \leq \Delta_0 \leq 4.8 \cdot 10^{-3}$, preferably $\Delta_0 \approx 4.34 \cdot 10^{-3}$;
b) $1.1 \cdot 10^{-3} \leq \Delta_1 \leq -0.9 \cdot 10^{-3}$, preferably $\Delta_1 \approx -1.03 \cdot 10^{-3}$;
c) $1.3 \cdot 10^{-3} \leq \Delta_2 \leq 1.7 \cdot 10^{-3}$, preferably $\Delta_2 \approx 1.5 \cdot 10^{-3}$;
d) $12.0\,\mu m \leq a \leq 14.0\,\mu m$, preferably a≈13.0 $\mu$m, $0.15 \leq r_1/a \leq 0.4$, preferably $r_1/a \approx 0.3$, and $0.65 \leq r_2/a \leq 0.85$, preferably $r_2/a \leq 0.8$.

The profile specifications can be understood as theoretical setpoint entries. In practice, drastic jumps in the refractive index are not able, as a rule, to be precisely implemented; rather all corners of a theoretical profile are rounded off. The refractive index characteristics can be produced by depositing thin layers, so that, in practice, even a theoretically constant n(r) has a wave-shaped characteristic. Therefore, the above explanations refer to the target specifications. Moreover, at r=0, for example, a theoretically rectangular core profile often has a so-called middle dip, a decline in the refractive index and, therefore, merely a refractive index characteristic that can be approximated by a rectangle. The middle dip can be avoided through improved technology in the manufacturing process.

The described profiles are able to be produced using conventional modified chemical vapor deposition (MCVD) techniques.

The fiber in accordance with the present invention can have a chromatic dispersion D, which, for wavelengths from 1400 nm to 1700 nm lies within the range of between 1.6 to 3.7 ps/(nm km) and, thus, substantially below the value of standard all-silica fibers. Given a careful manufacturing of the fibers, the simple structures and relatively large field radii can ensure small polarization mode dispersion (PMD) values of less than 0.5 ps/km$^{1/2}$.

The fibers can be made for the most part of silica glass, which is doped with appropriate materials, preferably with germanium or fluorine, in order to raise or lower the refractive index in the core and in the cladding layers. Since the core doping required to reach the differences in refractive indices varies within the usual range, one should not expect the attenuation values of the WDM fibers to be higher than the current standard.

In addition, the core radii and, in particular, the effective radii $w_{\mathit{eff}}$ of the fibers in accordance with the present invention are comparable to corresponding values of standard fibers. Since these quantities determine the polarization mode dispersion and the quantity of non-linear effects, both the PMD as well as the non-linear Kerr coefficient are comparable to those of standard fibers.

When fibers in accordance with the present invention are used, the transmission quality and transmission power of an optical transmission route can be enhanced as compared to standard optical fibers. Moreover, since a stabler signal form results from the lower dispersion, the glass fiber distance between the transmitter and receiver, respectively amplifier station, can be lengthened, which represents a cost savings. The small amount of pulse broadening makes it possible for substantially higher data rates to be transmitted, which is a prerequisite for ultra-high bit rate transmission systems.

DETAILED DESCRIPTION

Figure 1:
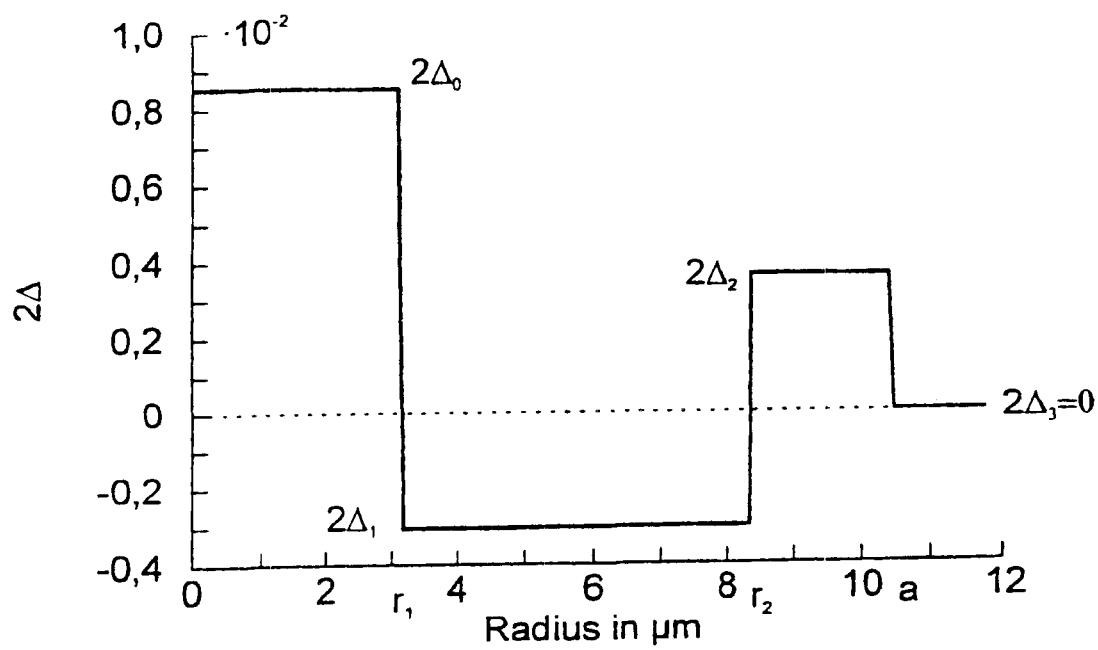
FIG. 1 shows a refractive index profile $\Delta(r)$ having a rectangular core structure.
Figure 3:
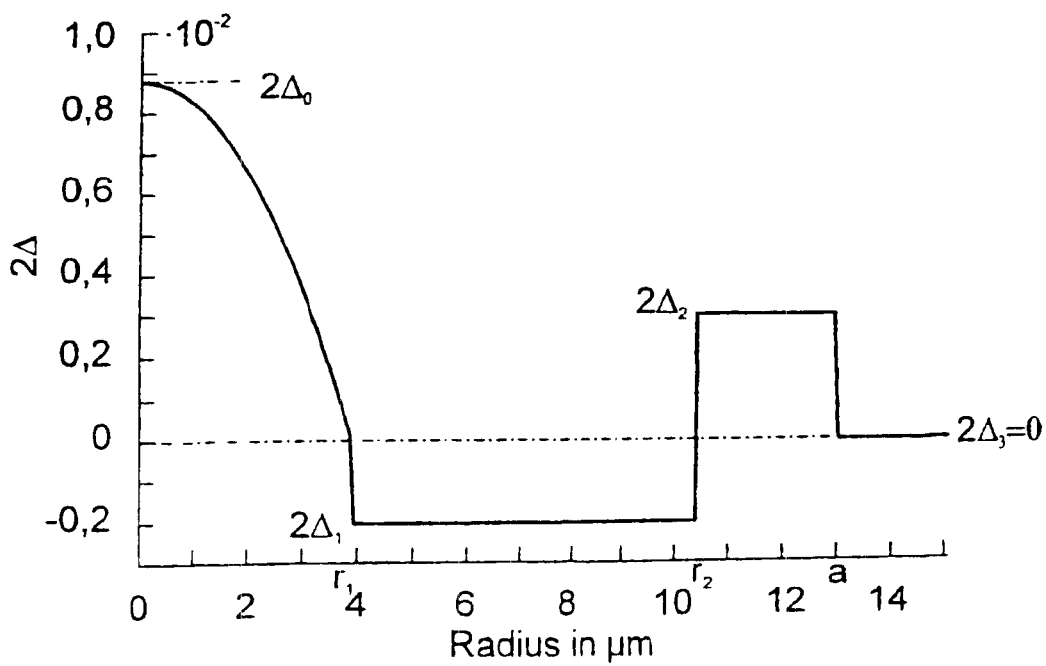
FIG. 3 shows a refractive index profile $\Delta(r)$ having a parabolic core structure.
Figure 5:
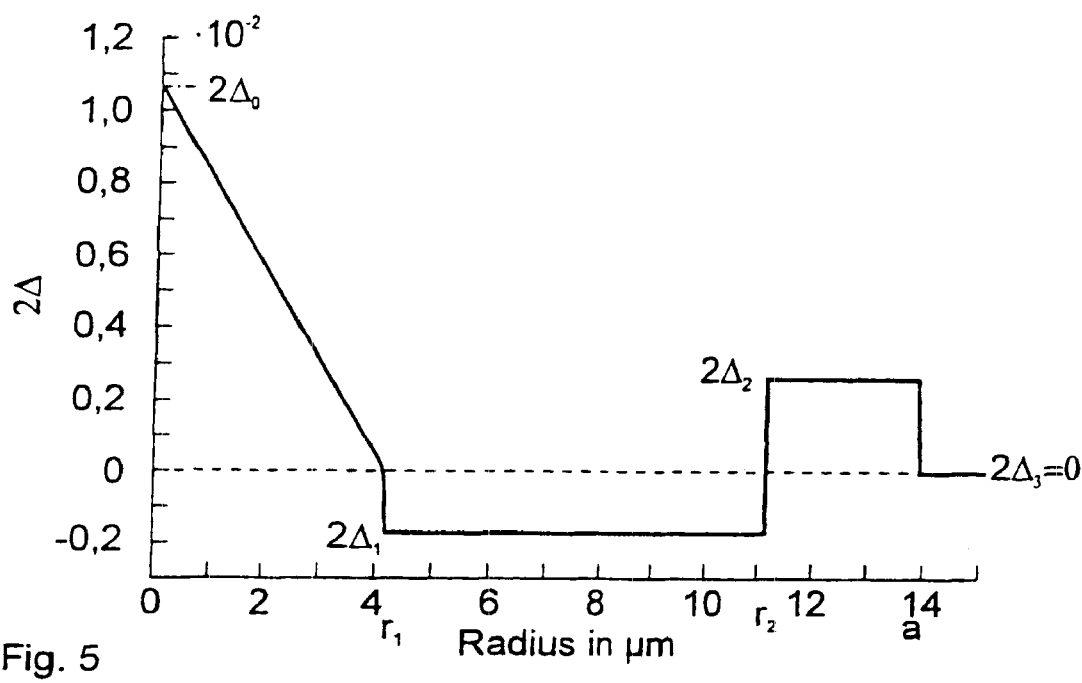
FIG. 5 shows a refractive index profile $\Delta(r)$ having a triangular core structure.

In FIGS. 1, 3 and 5, three fiber profiles $\Delta(r)$ are depicted, the relative refractive index $$\Delta(r) = \frac{1}{2}\left(\frac{n(r)^2}{n_c^2} - 1\right),$$

being plotted as a function of fiber radius r. The fibers constructed in this manner have the following dispersion values D and can be extremely broadband WDM fibers for the WDM operation in the third optical window: $D(\lambda) \leq 3.3$ ps/km*nm (profile 1, FIG. 1), $D(\lambda) \leq 2.8$ ps/km*nm (profile 2, FIG. 3) and $D(\lambda) \leq 3.1$ ps/km*nm (profile 3, FIG. 5) in the spectral region $1450 \leq <1650$ nm.

Due to their relatively simple structure (rectangular, parabolic, triangular core region, otherwise stepped), the described profiles can be conveniently manufactured using conventional MCVD techniques. Given a careful fiber fabrication, the simple structures and the large mode field radii ensure low PMD values (<0.5 ps/km$^{1/2}$).

FIG. 1 shows an example of a fiber profile in accordance with the present invention. The relative level is $2\Delta=0$, thus, n=$n_c$ (refractive index of the outer cladding region). The relative level is shown as a dotted line. Profile 1 is a triple-clad profile having the rectangular profile of the fiber core having the following characteristic data:

$2\Delta_0 = 8.36 \cdot 10^{-3}$ (fiber core)
$2\Delta_1 = -3.18 \cdot 10^{-3}$ (first inner cladding layer)
$2\Delta_2 = 3.5 \cdot 10^{-3}$ (second inner cladding layer)
$2\Delta_3 = 0$ (per definition, outer cladding layer)
Radii, respectively radii proportions a=10.4 $\mu$m, $r_1/a = 0.3$ and $r_2/a = 0.8$.

The fibers are manufactured, for example, on a silica glass base, for example, where $n_c = 1.4573$. In this case, the mentioned relative refractive indices $\Delta_i$ correspond to the following real refractive indices:

$n_0 = 1.4634$ (fiber core)
$n_1 = 1.4550$ (first inner cladding layer)
$n_2 = 1.4599$ (second inner cladding layer)
$n_c = 1.4573$ (outer cladding layer)

Starting out from silica glass as a base material, the refractive indices can be changed by doping with germanium or fluorine. The doping concentrations of the implantations required for this, in particular of the germanium, are so low, in this context, that there is no significant increase in the fiber attenuation, as is observed, for example, in the case of dispersion-compensating fibers. In addition, in the case of the fiber doping, one can avoid the difficulties that arise when working with high fluorine concentrations. The critical wavelength $\lambda_c$ was calculated and amounts to $\lambda_c$=1216 nm.

Figure 2A:
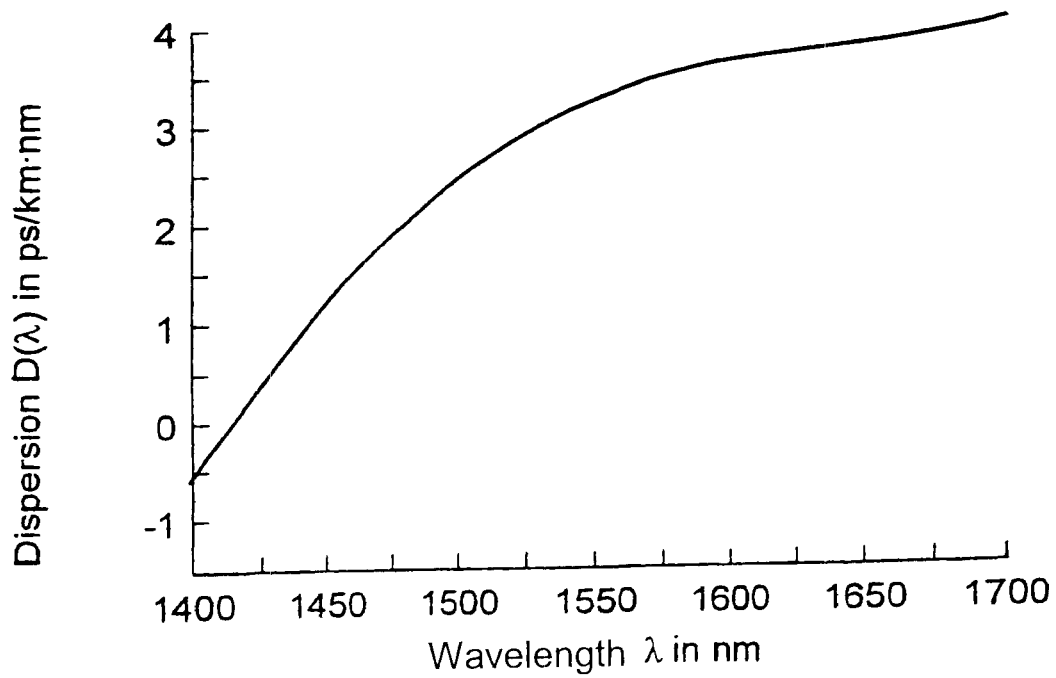
FIG. 2 shows the dispersion and the field radii $w_n$, $w_f$ and $w_{\mathit{eff}}$ as a function of the wavelength for the profile according to FIG. 1.
Figure 2B:
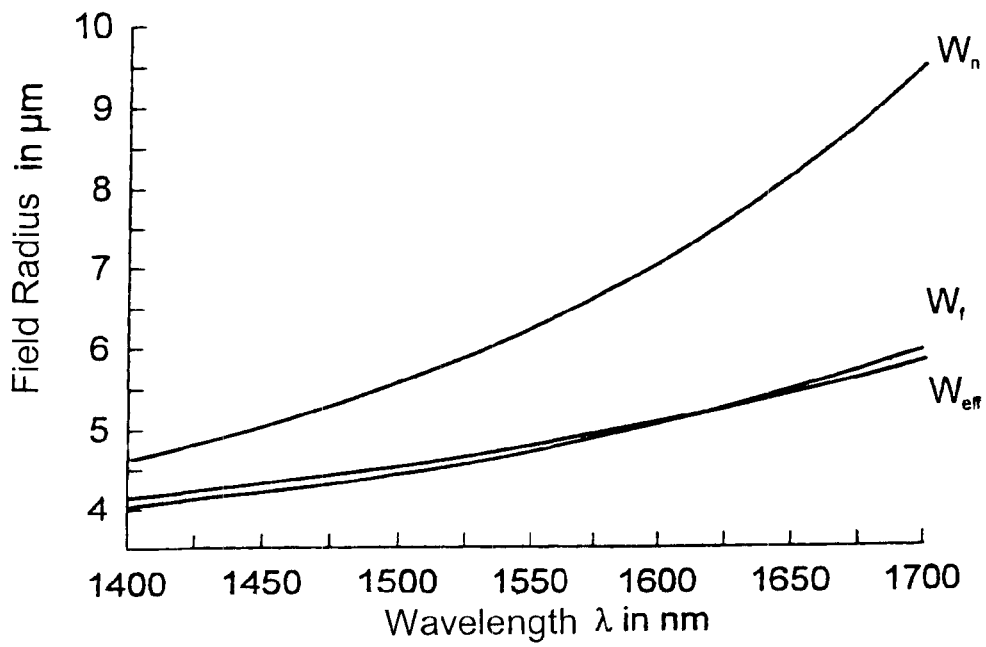

FIG. 2a shows the characteristic spectral curve of chromatic dispersion $D(\lambda)$; and FIG. 2b depicts the spectral mode field radius curves $w_n$ (Petermann I), $w_f$ (Petermann II) and $w_{\mathit{eff}}$ for profile 1. The values were computed from the profile data in a simulation calculation.

At wavelengths of around 1400 nm, dispersion $D(\lambda)$ is barely within the negative range. It rises to values of maximally 3.6 ps/km*nm, which are reached at wavelengths of around 1700 nm. Between $\lambda$=1550 and 1650 nm, the dispersion is positive (abnormal), and it increases from 2.8 to 3.4 ps/km*nm, so that, in this range, the dispersion curve shows a small slope $\Delta D/\Delta\lambda$.

In the entire described spectral range, the mode field radii are between 3.5 and 5 $\mu$m ($w_f$ and $w_{\mathit{eff}}$) and, respectively, between 4 and 7 $\mu$m ($w_n$), thus within the range of standard fibers, where $w_{\mathit{eff}} \approx 4.5$ $\mu$m.

FIG. 3 shows the profile of another triple-clad fiber according to the present invention, having the parabola profile of the fiber core. The characteristic data of the fibers are:

$2\Delta_0$=8.68·10$^{-3}$ (maximum refractive index in the fiber core, the actual profile characteristic $\Delta(r)$, at this value, is only at r=0, and then drops off)

$2\Delta_1$=−2.06·10$^{-3}$ $2\Delta_2$=3.0·10$^{-3}$

Radii (ratios) a=13.0 $\mu$m, $r_1/a$=0.3 and $r_2/a$=0.8.

The critical wavelength of these fibers amounts to $\lambda_c$=1482 nm.

Figure 4A:
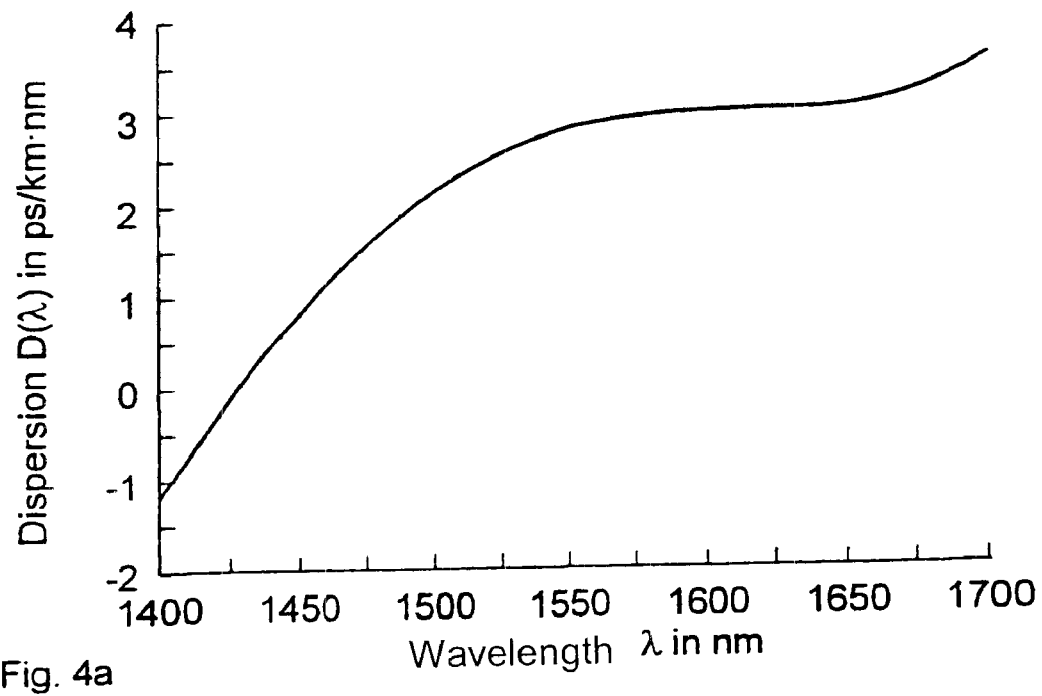
FIG. 4 shows the dispersion and the field radii $w_n$, $w_f$ and $w_{\mathit{eff}}$ as a function of the wavelength for the profile according to FIG. 3.
Figure 4B:
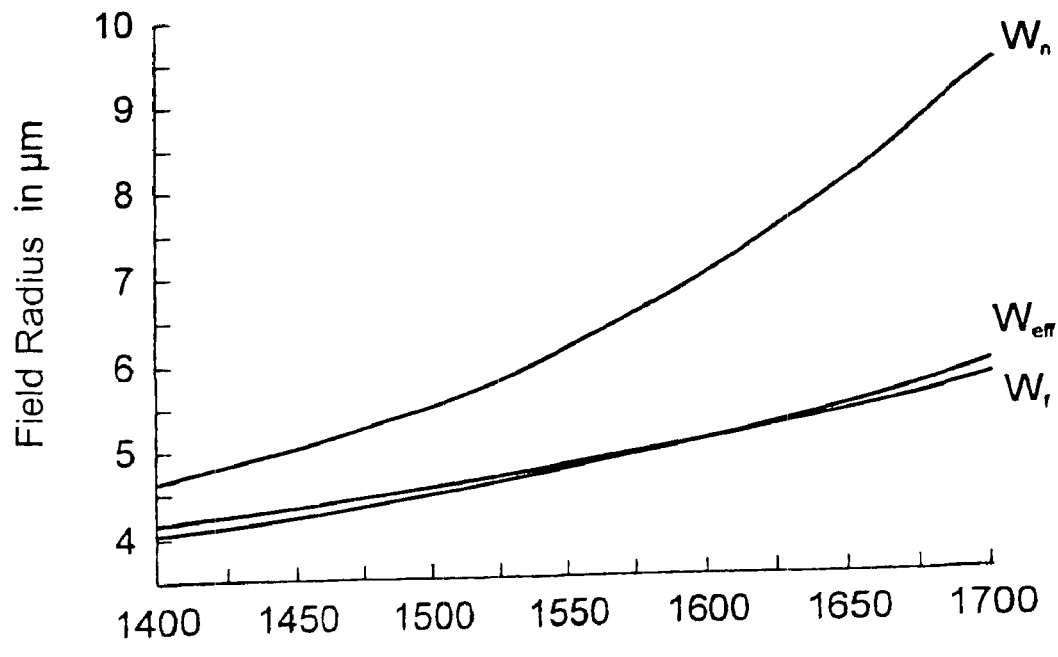

FIG. 4a, in turn, shows the spectral characteristic of the chromatic dispersion $D(\lambda)$, and FIG. 4b illustrates the spectral mode-field radius curves $w_f$, $w_n$ and $w_{\mathit{eff}}$. Between 1450 and 1650 nm, the dispersion is positive and remains below 3 ps/km*nm.

FIG. 5 depicts the profile of another triple-clad fiber according to the present invention whose fiber core has a triangular profile. The characteristic data of the fibers are:

$2\Delta_0$(max)=10.62·10$^{-3}$ (maximum refractive index in the fiber core)

$2\Delta_1$=−1.81·10$^{-3}$, $2\Delta_2$=2.5·10$^{-3}$,

Radii (ratios) a=13.9 $\mu$m, $r_1/a$=0.3 and $r_2/a$=0.8. The critical wavelength is $\lambda_c$=1482 nm.

Figure 6A:
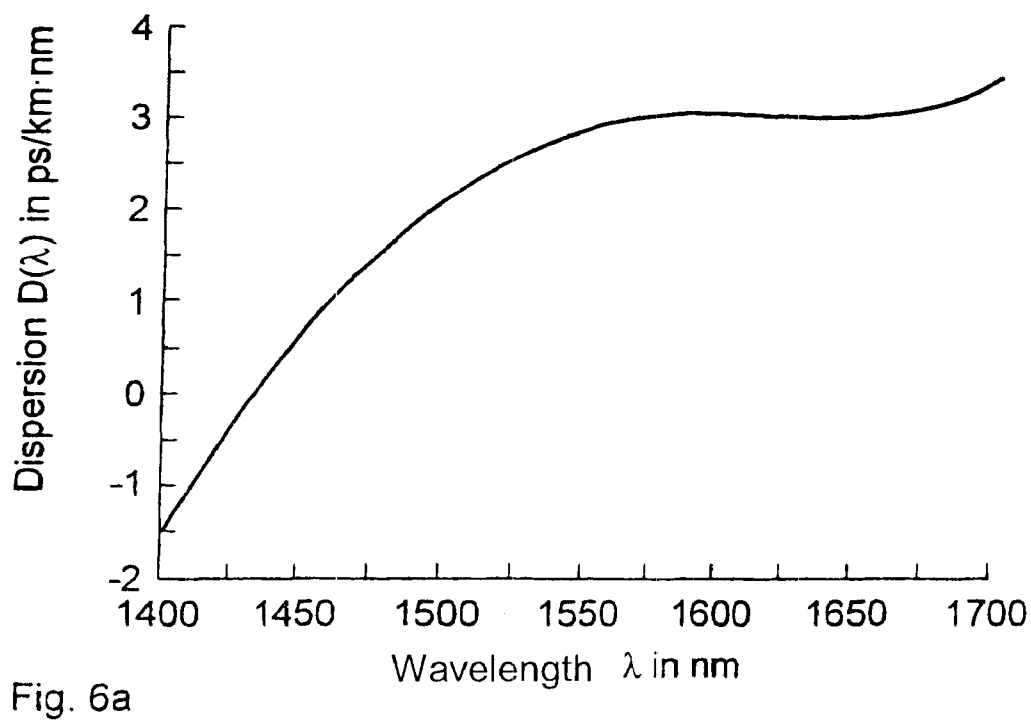
FIG. 6 shows the dispersion and the field radii $w_n$, $w_f$ and $w_{\mathit{eff}}$ as a function of the wavelength for the profile according to FIG. 5.
Figure 6B:
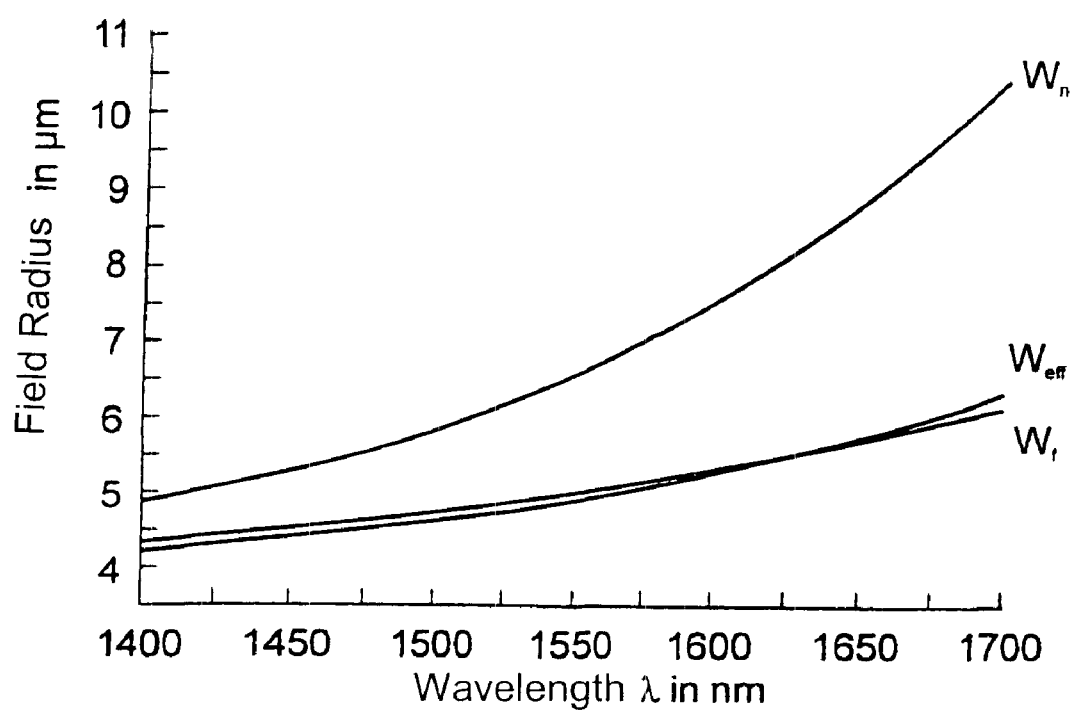

FIG. 6 shows the spectral characteristic of the chromatic dispersion and the spectral mode-field radius curves. Between 1450 and 1650 nm, in turn, the dispersion is positive and, given a small a slope angle, remains below 3.1 ps/km*nm.

A tolerance analysis was performed on the described profiles and the indicated parameters, in which the relative refractive indices $\Delta_i$ and radius a were each altered by ±1%. For values $r_i/a$, an absolute change of around ±0.005 was assumed. In response to a single parameter change, the critical wavelength changes by maximally about 15 nm, the greatest deviation occurring in response to a change of core radius a. With respect to the dispersion characteristic, the parameter changes lead to a deviation of maximally ±2 ps/km*nm, which likewise leads to permissible dispersion values. Field radius $w_n$, changes by maximally ±0.5 $\mu$m, while field radii $w_{\mathit{eff}}$ and $w_f$ are substantially stabile.

Overall, therefore, one can assess that the responsivity to parameter changes is able to be controlled by technology. Since in the case of the fibers according to the present invention, the waveguide dispersion enters into the dispersion behavior, a somewhat greater responsivity to parameters is to be expected than in the case of standard fibers at 1300 nm. However, these responsivity levels are far below those of dispersion-compensation fibers which, for their part, are able to be routinely fabricated.

The fibers in accordance with the present invention is useful for optical data transmission in the third optical window and, thus, for high bit-rate optical communications networks to be newly established. Due to the substantially reduced dispersion as compared to standard fibers, the fiber in accordance with the present invention is also useful for wavelength division multiplex operation, high transmission rates with high transmission quality being attainable.

What is claimed is:

1. A single-mode optical fiber having a radius r and having low dispersion for the wavelength division multiplex operation of an optical transmission path, comprising:

a central fiber core having a central radius $r_1$ and an absolute refractive index $\Delta_0$, a first inner fiber cladding layer having a first outer radius $r_2$ and a first inner refractive index $\Delta_1$, a second inner fiber cladding layer having a second outer radius a, so that a>$r_2$, and a second inner refractive index $\Delta_2$, an outer fiber cladding layer having an outer refractive index $\Delta_3$, the optical fiber having a refractive index profile n(r), the refractive index profile being configured as not-constant as a function of the fiber radius r, the optical fiber cladding layer being in an area defined by r>a and having a relative refractive index profile $\Delta(r)$, where $$\Delta(r) = \frac{1}{2}\left(\frac{n(r)^2}{n_c^2} - 1\right),$$

so that when the relative refractive index profile $\Delta(r)$ is about 0 then $n_c$ is a constant reference refractive index, wherein the second outer radius a is 8.0 $\mu$m≦a≦16 $\mu$m so that 0.15≦$r_1$/a≦0.4 and 0.65≦$r_2$/a≦0.85, wherein for an area defined by r≦$r_1$ the relative refractive index profile $\Delta(r)$ is $\Delta_0$≧$\Delta(r)$≧0 and the absolute refractive index $\Delta_0$ is 3.5·10$^{-3}$≦$\Delta_0$≦6.0·10$^{-3}$, wherein for an area defined by $r_1$<r≦$r_2$ the relative refractive index profile $\Delta(r)$ is 0≧$\Delta(r)$≧$\Delta_1$ and the first inner refractive index $\Delta_1$ is −2.0·10$^{-3}$≦$\Delta_1$≦0.6·10$^{-3}$, wherein for an area defined by $r_2$<r≦a the relative refractive index profile $\Delta(r)$ is $\Delta_2$≧$\Delta(r)$≧0, and the second inner refractive index $\Delta_2$ is 1.0·10$^{-3}$≦$\Delta_2$≦2.0·10$^{-3}$, so that within a wavelength range of between about 1400 and about 1700 nm, the optical fiber has a dispersion value of between about −1.6 and about +3.7 ps/(nm km).

2. The optical fiber as recited in claim 1, wherein the central fiber core radius $r_1$ is one of 2.5 $\mu$m≦$r_1$≦5.5 $\mu$m and 3.5 $\mu$m≦$r_1$≦4.5 $\mu$m.

3. The optical fiber as recited in claim 1, wherein the first outer radius $r_2$ is one of 8 $\mu$m≦$r_2$≦12 $\mu$m and 9 $\mu$m≦$r_2$≦11 $\mu$m.

4. The optical fiber as recited in claim 1, wherein second outer radius a is 9 $\mu$m≦a≦15 $\mu$m.

5. The optical fiber as recited in claim 1, wherein the first inner refractive index $\Delta_1$ is −1.2·10$^{-3}$≦$\Delta_1$≦−0.6·10$^{-3}$.

6. The optical fiber as recited in claim 1, wherein in the region of the central fiber core, the refractive index profile has at least one of a rectangular shape, a triangular shape, a trapezoidal shape and a parabola-like shape, the relative refractive index profile $\Delta(r)$ assuming that the maximum absolute refractive index $\Delta_0$ is at least in the vicinity of the optical fiber midpoint for the central fiber core radius r equal to about 0.

7. The optical fiber as recited in claim 1, wherein in the region of the central fiber core, the relative refractive index profile $\Delta(r)$ is rectangular and the absolute refractive index $\Delta_0$ is one of $3.7 \cdot 10^{-3} \leq \Delta_0 \leq 4.6 \cdot 10^{-3}$ and about $4.16 \cdot 10^{-3}$, the first inner refractive index $\Delta_1$ is one of $-1.8 \cdot 10^{-3} \leq \Delta_1 \leq -1.4 \cdot 10^{-3}$ and about $-1.59 \cdot 10^{-3}$, the second inner refractive index $\Delta_2$ is one of $1.6 \cdot 10^{-3} \leq \Delta_2 \leq 1.9 \cdot 10^{-3}$ and about $1.75 \cdot 10^{-3}$, the outer radius a is one of $9.4 \, \mu m \leq a \leq 11.4 \, \mu m$ and $10.4 \, \mu m$ so that $r_1/a$ is one of $0.15 \leq r_1/a \leq 0.4$ and about $0.3$, and so that $r_2/a$ is one of $0.65 \leq r_2/a \leq 0.85$ and about $0.8$.

8. The optical fiber as recited in claim 1, wherein in a region of the central fiber core, the relative refractive index profile $\Delta(r)$ is triangular and the absolute refractive index $\Delta_0$ is one of $4.7 \cdot 10^{-3} \leq \Delta_0 \leq 5.8 \cdot 10^{-3}$ and about $5.31 \cdot 10^{-3}$, the first inner refractive index $\Delta_1$ is $-1.0 \cdot 10^{-3} \leq \Delta_1 \leq -0.8 \cdot 10^{-3}$ and about $-0.9 \cdot 10^{-3}$, the second inner refractive index $\Delta_2$ is one of $1.1 \cdot 10^{-3} \leq \Delta_2 \leq 1.4 \cdot 10^{-3}$ and about $1.25 \cdot 10^{-3}$, the outer radius a is one of $12.9 \, \mu m \leq a \leq 14.9 \, \mu m$ and about $13.9 \, \mu m$ so that $r_1/a$ is one of $0.15 \leq r_1/a \leq 0.4$ and about $0.3$, and so that $r_2/a$ is one of $0.65 \leq r_2/a \leq 0.85$ and about $0.8$.

9. The optical fiber as recited in claim 1, wherein in a region of the fiber core, the relative refractive index profile $\Delta(r)$ is a parabola-profile and the absolute refractive index $\Delta_0$ is one of $3.9 \cdot 10^{-3} \leq \Delta_0 \leq 4.8 \cdot 10^{-3}$ and about $4.34 \cdot 10^{-3}$, the first inner refractive index $\Delta_1$ is one of $-1.1 \cdot 10^{-3} \leq \Delta_1 - 0.9 \cdot 10^{-3}$ and about $-1.03 \cdot 10^{-3}$, the second inner refractive index $\Delta_2$ is one of $1.3 \cdot 10^{-3} \leq \Delta_2 \leq 1.70 \cdot 10^{-3}$ and about $1.5 \cdot 10^{-3}$, the outer radius a is one of $12.0 \, \mu m \leq a \leq 14.0 \, \mu m$ and about $13.0 \, \mu m$, so that $r_1/a$ is one of $0.15 \leq r_1/a \leq 0.4$ and about $0.3$, and so that $r_2/a$ is one of $0.65 \leq r_2/a \leq 0.85$ and about $0.8$.

10. The optical fiber as recited in claim 1, wherein in a region of the first and second inner fiber cladding layers, the relative refractive profile index $\Delta(r)$ is constant and is about equal to the first inner refractive index $\Delta_1$ and the second inner refractive index $\Delta_2$.

11. The optical fiber as recited in claim 1, wherein the optical fiber is in part made of silica glass which is doped with one of an appropriate material for modifying a refractive index, germanium and fluorine, so that a refractive index of the central fiber core, the first and second inner fiber cladding layers and the outer fiber cladding layer, is one of raised and lowered.

12. The optical fiber as recited in claim 1, wherein in the wavelength range of about 1400 to 1700 nm, the optical fiber exhibits a dispersion of one of less than 4 ps/(km nm) and about 3 ps/(km nm).

* * * * *